United States Patent [19]
Kwon

[11] Patent Number: 5,818,422
[45] Date of Patent: Oct. 6, 1998

[54] MOUSE FOR COMPUTERS

[76] Inventor: Yool Kwon, # Na-1301 Samsung Apt., Kwangjang-dong, Kwangjin-gu, Seoul, Rep. of Korea

[21] Appl. No.: 746,975

[22] Filed: Nov. 19, 1996

[30] Foreign Application Priority Data

Nov. 21, 1995 [KR] Rep. of Korea ............... 95-34584

[51] Int. Cl.[6] ........................................... G07G 5/08
[52] U.S. Cl. ............................... 345/157; 345/163
[58] Field of Search ............................ 345/156, 157, 345/163; D14/114, 100; 439/446

[56] References Cited

U.S. PATENT DOCUMENTS

| | | | |
|---|---|---|---|
| 3,032,740 | 5/1962 | Hoorn | 339/195 |
| 4,719,314 | 1/1988 | Nothnagel et al. | 439/446 |
| 5,063,289 | 11/1991 | Jasinski et al. | 345/163 |
| 5,340,067 | 8/1994 | Martin et al. | |
| 5,400,054 | 3/1995 | Dorst | 345/157 |
| 5,528,523 | 6/1996 | Yoshida | 345/156 |

*Primary Examiner*—Richard A. Hjerpe
*Assistant Examiner*—Tracy H. Nguyen
*Attorney, Agent, or Firm*—Ladas & Parry

[57] ABSTRACT

A mouse for a computer having a longitudinal slot formed in a side wall of the mouse body through which the mouse cable passes to the computer. The guide slot is notched along one edge with rounded grooves for removably receiving a connector of the mouse cable and thereby selectively adjusting the connected position of the cable at the side wall of the mouse in accordance with the size and configuration of the hand of a user. A pointer in the form of an arrow extends forwardly at the front of the mouse to enable the mouse to precisely follow an original which is to be copied on a screen of the computer.

6 Claims, 4 Drawing Sheets

FIG. 1 *PRIOR ART*
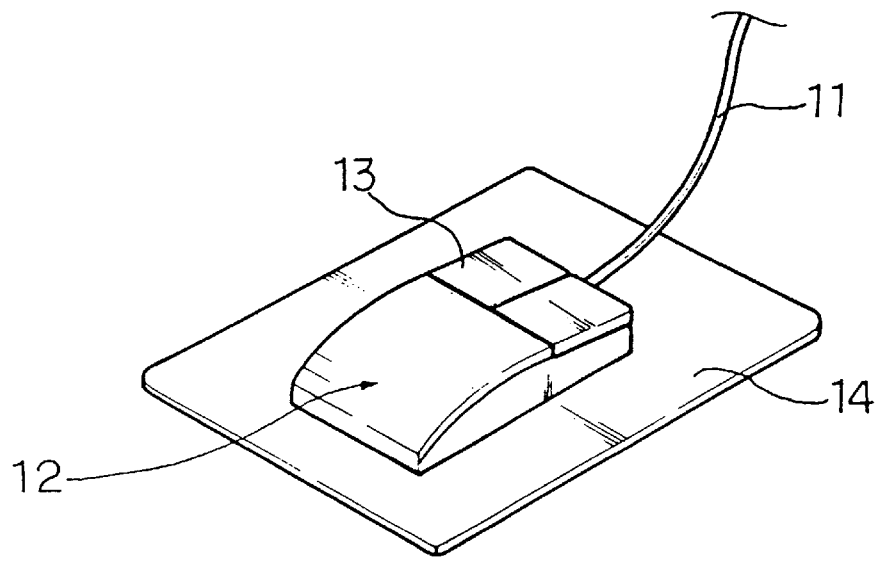
FIG. 2 *PRIOR ART*
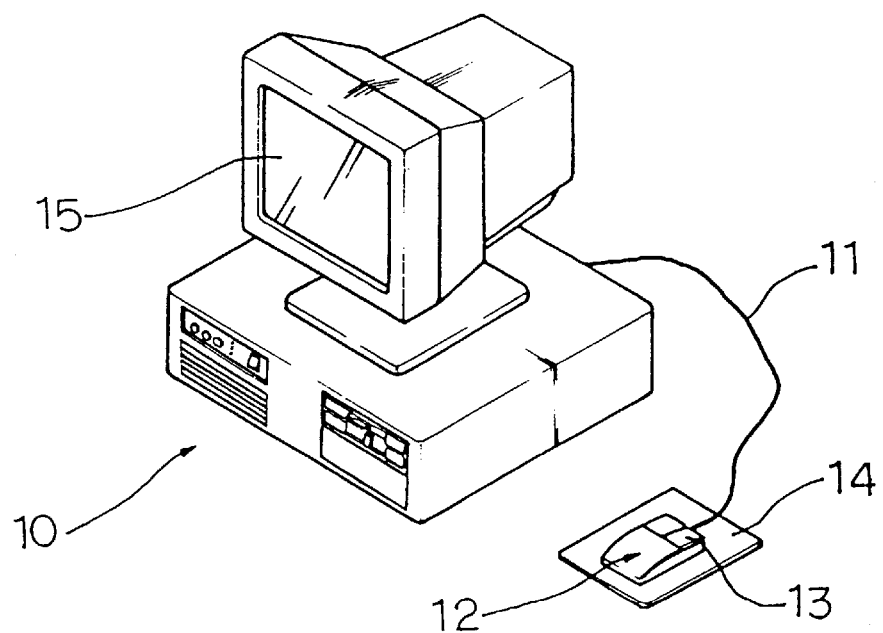

MOUSE FOR COMPUTERS

BACKGROUND OF THE INVENTION

1. Field of the Invention

The present invention relates, in general, to a mouse for computers and, more particularly, to a structural improvement in such a mouse for extending a mouse cable from a side wall of the mouse to a computer thereby preventing the cable from interfering with any other items placed on a table in front of the mouse operating area and for selectively adjusting the connected position of the mouse cable on the mouse in accordance with the size and configuration of the hand of the user thereby adjusting fitting the mouse to the hand of the user irrespective of the size and configuration of the hand.

2. Description of the Prior Art

FIGS. 1 to 3 show a typical mouse for computers, which is provided with a rolling ball on its bottom and is moved by hand across a flat mouse pad and controls the movement of the cursor (pointer) on a computer screen by copying on the screen the movements of the ball. As shown in FIGS. 1 and 2, the mouse 12 is electrically connected to a computer 10 by a cable 11 and is provided with a plurality of, preferably two, function buttons 13 on its top. The cable 11 extends from the front wall of the mouse 12. In order to allow the ball (not shown) of the mouse 12 to freely roll, the mouse 12 is moved by hand across a flat mouse pad 14. The operational effect of the typical mouse will be described hereinbelow with reference to FIGS. 1 to 3. When the mouse 12 is connected to the computer 10 through the cable 11, a pointer (cursor) appears on the computer screen 15 thereby informing a user of the existing position of the mouse 12 on the pad 14. In order to point to an icon on the computer screen 15 with the mouse 12 thereby giving the computer an instruction, the mouse 12 with the rolling ball is moved by hand across the pad 14 thus controlling the movement of the pointer on the computer screen 15 by copying on the screen 15 the movements of the ball. In the above state, the pointer moves on the screen 15 simultaneously with movements of the mouse's ball, so that the user can easily move the mouse 12 across the pad 14 while checking the moving direction of the pointer toward a pointed icon on the screen 15. When the mouse pointer reaches the selected icon on the computer screen 15, a function button 13 of the mouse 12 is pressed down so as to give the computer an instruction. While the mouse 12 is moved by hand across the flat pad 14, the ball of the mouse 12 rolls on the pad 14. In the above state, the movements (rolling angles) of the mouse's ball on the pad 14 are calculated into the movement (moving angle) of the pointer on the computer screen 15 and in turn is copied on the screen 15. However, the typical mouse 12 has the following problem caused by the cable 11 which extends from the front wall of the mouse 12. That is, when any other items are placed on a table in front of the mouse operating area, the items regrettably interfere with the cable preventing the mouse 12 from freely moving across the pad 14. The typical mouse is thus inconvenient to use.

SUMMARY OF THE INVENTION

It is, therefore, an object of the present invention to provide a mouse for computers in which the above problem can be overcome and wherein the mouse has a cable extending from a side wall of the mouse and in which the connected position of the cable can be adjusted between a plurality of positions on the side wall of the mouse, thereby being convenient to users. In order to accomplish the above object, the present invention provides a mouse electrically connected to a computer through a cable, comprising a guide slot extending longitudinal in a side wall of the mouse and adapted for passing the cable therethrough, thus causing the cable to extend from the side wall to the computer.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view showing the configuration of a typical mouse for computers;

FIG. 2 is a perspective view showing a computer provide with the typical mouse;

DESCRIPTION OF THE PREFERRED EMBODIMENTS

Figure 3:
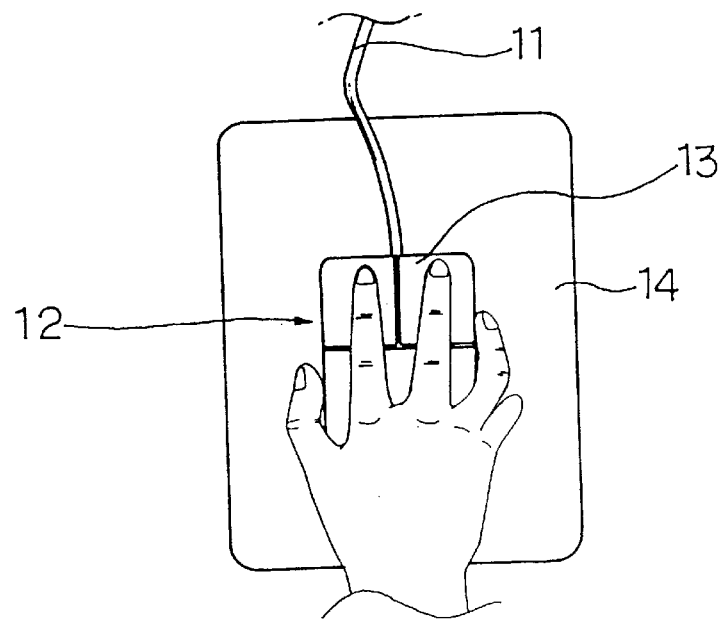
FIG. 3 plan view showing the typical mouse, when a user moves the typical mouse across a flat mouse pad.
Figure 4:
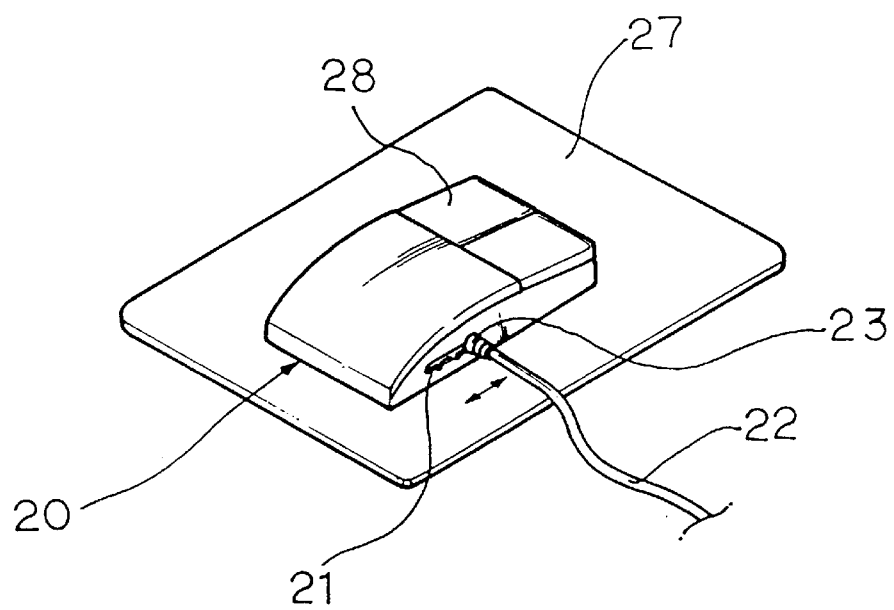
FIG. 4 is a perspective view showing the configuration and construction of a mouse for computers having a movable cable extending from a side wall of the mouse in accordance with the primary embodiment of the present invention.
Figure 5:
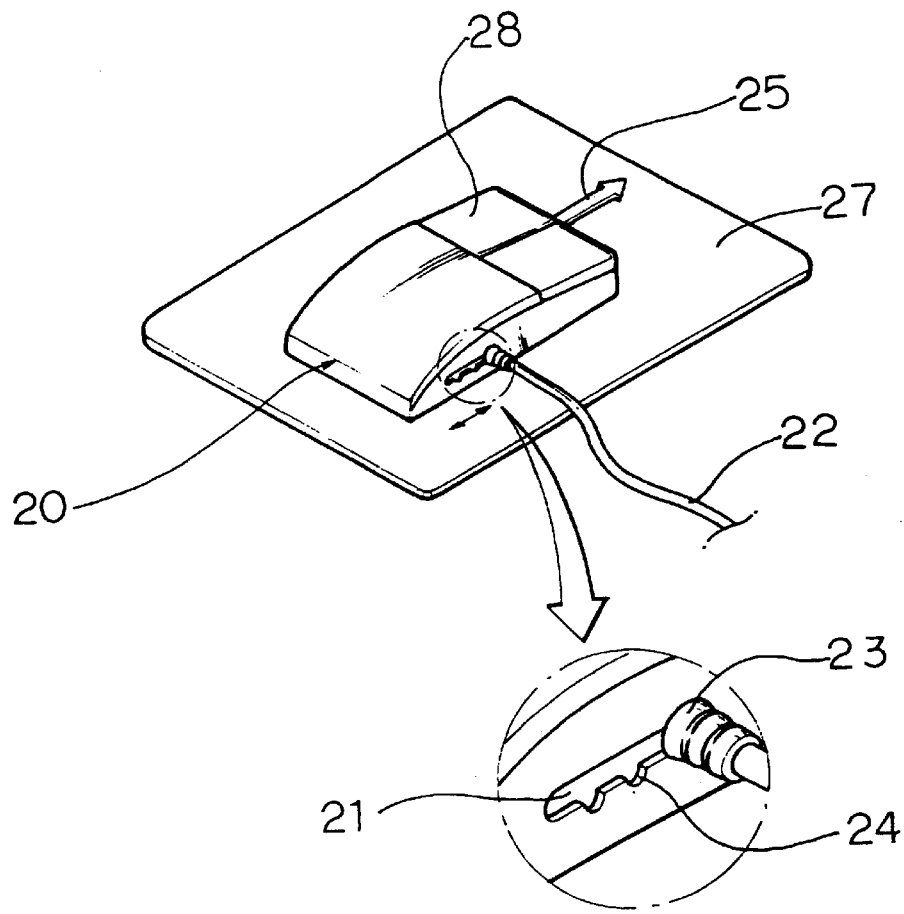
FIG. 5 is a perspective view showing the configuration and construction of a mouse having both a movable cable on its side wall and an arrow-shaped direction mark on its front wall in accordance with a second embodiment of the invention.
Figure 6:
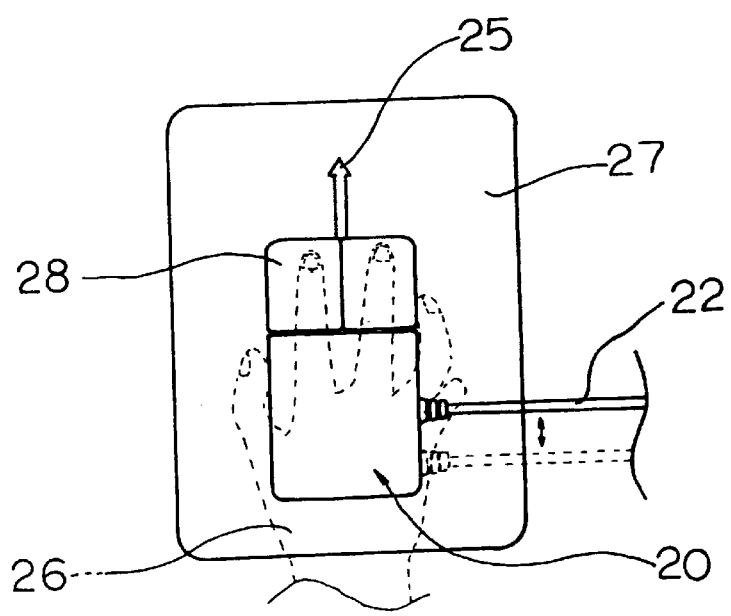
FIG. 6 is a plan view of the mouse according to the second embodiment of this invention, showing adjustment of the cable connector's position on the side wall of the mouse.
Figure 7:
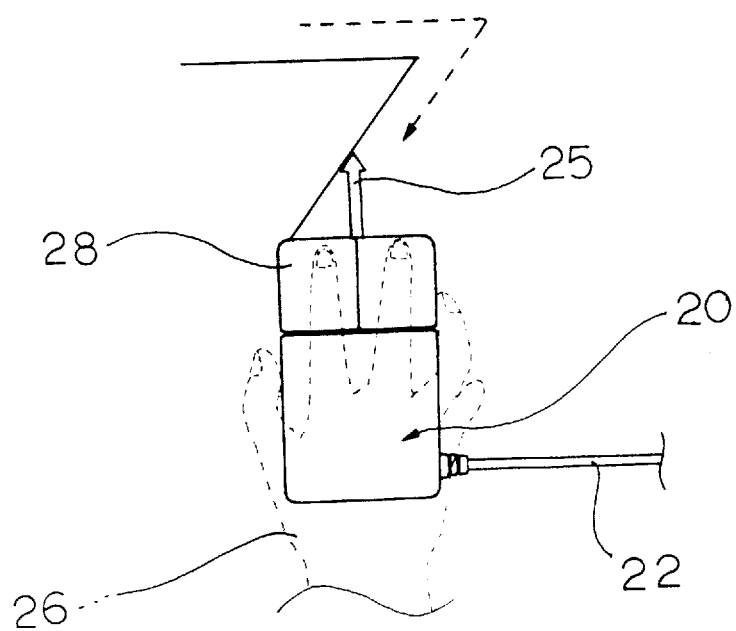
FIG. 7 is a plan view showing the mouse provided with the arrow-shaped direction mark, when the mouse is moved by hand across an original picture laid on the mouse pad in order to copy the original picture on a computer screen.

FIG. 4 shows a mouse having a movable cable extending from a side wall of the mouse in accordance with the primary embodiment of this invention. FIGS. 5 to 7 show a mouse having both a movable cable on its side wall and a direction mark on its front wall in accordance with a second embodiment of this invention.

As shown in FIGS. 4 to 7, the mouse 20 of this invention has a multi-stepped, preferably three-stepped, guide slot 21. The guide slot 21 extends longitudinal in the side wall of the mouse 20, at an intermediate location between the front and the back of the mouse lower edge of the slot 21 is notched in order to form a plurality, preferably three, regularly-spaced rounded fitting grooves 24. Removably fitted in any groove 24 of the guide slot 21 is a cable connector 23. The cable connector 23 has a configuration which is suitable for being detachably fitted in any groove 24 of the slot 21. A mouse cable 22, which extends from the mouse 20 to a computer, passes through the cable connector 23, thereby being detachably held in any groove 24 of the guide slot 21. The cable 22 thus extends from the side wall of the mouse 20 to the computer. Of course, it should be understood that the fitting grooves 24 may be formed in another position in the guide slot 21 without affecting the functioning of this invention. In accordance with the second embodiment of this invention, an arrow-shaped direction mark 25 is provided on the front wall of the mouse 20 in order to improve the operational precision of the mouse 20 while the mouse 20 is moved across a mouse pad 27. Particularly, the direction mark 25 is preferably used in a graphic operation, for example, when copying a picture on a computer screen.

In FIGS. 4 to 7, the reference numeral 26 denotes the hand of a user, and the numeral 28 denotes function buttons provided on the top of the mouse 20.

The operational effect of the mouse 20 of this invention will be described hereinbelow.

Prior to moving the mouse 20 across the pad 27 in a computer operation, the position of the cable connector 23 inside the guide slot 21 is selectively adjusted in order to allow the mouse 20 to substantially meet the size and configuration of the users hand 26 as shown in FIGS. 4 to 6. The cable connector 23 is made of a slightly-flexible material, so that the connector 23 can elastically move between the three positions formed by the rounded grooves 24 in the guide slot 21 as shown by the arrows in FIGS. 4 to 6. As the connected position of the cable 22 at the side wall of the mouse 20 is adjusted as described above, the mouse 20 is comfortably fitted to the users hand 26 irrespective of the size and configuration of the hand 26. When the mouse 20 is used for copying a picture on a computer screen, the original picture is laid on the mouse pad 27 prior to laying the mouse 20 on the original picture as shown in FIG. 7. Thereafter, the mouse 20 is carefully moved by hand across the original picture under the guide of the arrow-shaped direction mark 25 moving along the lines on the original picture, thereby precisely copying the original picture on the computer screen. In the above state, the arrow tip of the direction mark 25 moves along the lines on the original picture, so that it is possible to precisely copy the original picture on the computer screen. Therefore, the mouse 20 provided with the arrow-shaped direction mark 25 is preferably used in a computer-graphic operation.

When the mouse 20 is used for moving the pointer on the computer screen 15 in order to point to an icon, an operator freely moves the mouse 20, which is free from the arrow-shaped direction mark 25, across the mouse pad 27 while selectively pressing down the buttons 28. As described above, the present invention provides a structurally-improved mouse for computers. In the mouse of this invention, the mouse cable extends from a side wall of the mouse to a computer. Therefore, even when any other items are placed on a table in front of the mouse operating area, the cable is free from interference with the items thereby allowing the mouse to freely move across the mouse pad. The mouse is thus convenient to use. In addition, the connected position of the mouse cable on the side wall of the mouse can be adjusted in order to meet the size and configuration of the user's hand, so that the mouse is comfortably fitted to the hand irrespective of the size and configuration of the hand. Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mouse for a computer comprising a mouse body having side walls, a front wall, a top and a bottom, a plurality of function buttons at said top of the mouse body for being manipulated by a user for operation with the computer, said mouse body having a rolling ball at the bottom which is movable on a support surface as the mouse is freely moved by the user on the support surface to control movement of a cursor on a screen for the computer, a cable connecting the mouse body to the computer, one of said side walls of said mouse body having a longitudinal slot at an intermediate position between the front and rear of said mouse body, said cable being connected to said mouse body through said slot to extend from said one of the side walls and leave the front of the mouse body clear for unobstructed movement without interference by the cable, said longitudinal slot providing a plurality of connection positions in which said cable is selectively connected to the mouse body to accommodate different hand sizes of different users, and a pointer extending forwardly of the mouse body at the front of the mouse body to enable the user to precisely move the mouse body along an original which is placed on the support surface and is to be copied on the computer, said pointer having the shape of an arrow.

2. A mouse as claimed in claim 1, wherein said slot in said one side wall of the mouse body has upper and lower edges, one of said edges being provided with a plurality of notches into which said cable is supported, said notches providing said plurality of connection positions for said cable.

3. A mouse as claimed in claim 2, wherein said notches are in said lower edge of said slot.

4. A mouse as claimed in claim 3, wherein said cable includes a connector which has flexibility and is selectively engaged in said notches.

5. A mouse as claimed in claim 4, wherein said notches are in the form of rounded grooves.

6. A mouse as claimed in claim 1, wherein said arrow has a pointed tip.

\* \* \* \* \*